Aug. 1, 1939.    J. W. FERREE    2,167,883
PIG CASTING MACHINE
Filed April 26, 1938    8 Sheets-Sheet 4

INVENTOR
Jay W. Ferree,
By Archworth Martin,
ATTORNEY

Aug. 1, 1939.  J. W. FERREE  2,167,883
PIG CASTING MACHINE
Filed April 26, 1938  8 Sheets-Sheet 5

INVENTOR
Jay W. Ferree,
By Archworth Martin
ATTORNEY.

Patented Aug. 1, 1939

2,167,883

UNITED STATES PATENT OFFICE 2,167,883

PIG CASTING MACHINE

Jay W. Ferree, Pittsburgh, Pa.

Application April 26, 1938, Serial No. 204,321

10 Claims. (Cl. 22—62)

This invention relates to pig iron casting machines.

For a period of approximately forty years, pig casting machines have not been materially changed in design. The machines now in use and as used over this long period embody two spaced endless chains between which the pig moulds are supported, and head and tail sprockets over which the chains run. The links of these chains also carry wheels which run on support rails.

Because of the high temperatures to which the links, wheels and pins on which the wheels were journaled, were subjected, the links, pins and wheels were made of heat and corrosive resistant alloys. Also because of design of such prior art machines and the temperature conditions encountered, it was impractical and impossible to beneficially lubricate the wheel pins. This fact required the wheels to be made with bores much larger than the pins. These large pin clearances would not hold lubricant and besides were receptacles for dirt, with the result that the wheels often locked and slid on the rails causing flat spots to wear on the wheels. Furthermore, because of the arrangement of the links and wheels, the sprockets could not engage the link pins in such a way as to effect a straight or line-in-line pull on the links. This resulted both in excessive wear and bending of the link pins.

In the prior art type of pig casting machines, many moving parts were involved, and this together with the aforementioned structural features of such machines, resulted in high maintenance and replacement costs. Furthermore, the rails of the prior art machines would bend and warp in service, causing the chains to run unevenly and to get out of alignment, and a most common objection was that one chain would wear more than the other, with the result that one chain would lag behind the other.

An object of this invention is to provide a pig casting machine that shall be more rugged, simpler in design, and more economical to operate than prior art machines.

Another object of the invention is to provide a pig casting machine in which the wheels formerly carried by the chains of prior art machines are eliminated from the chains and utilized as support tracks for the chains.

A further object of the invention is to provide a track wheel construction that will make lubrication, preferably sealed lubrication, possible and practicable.

A still further object of the invention is to provide a chain and sprocket construction that will impose a straight or line-in-line pull on the chain links and distributed and balanced shear and bending loads on the link pins.

A still further object of the invention is to provide a chain construction in which there will be no wear on the male and female ends of the links, and to provide a compound bushing type link pin that will take all the wear and be easily replaced or renewed.

A still further object of the invention is to provide a novel and improved construction for attaching the pig moulds to the links, and a construction that will allow for easy renewal or replacement of moulds.

And a still further object of the invention is to provide a pig casting machine that shall have decidedly fewer moving and wearing parts than any prior art pig casting machine known to me.

Another object of my invention is to provide means which will permit use of the apparatus even after the joints in one chain have become so worn that it lags behind the other chain.

Figure 1:
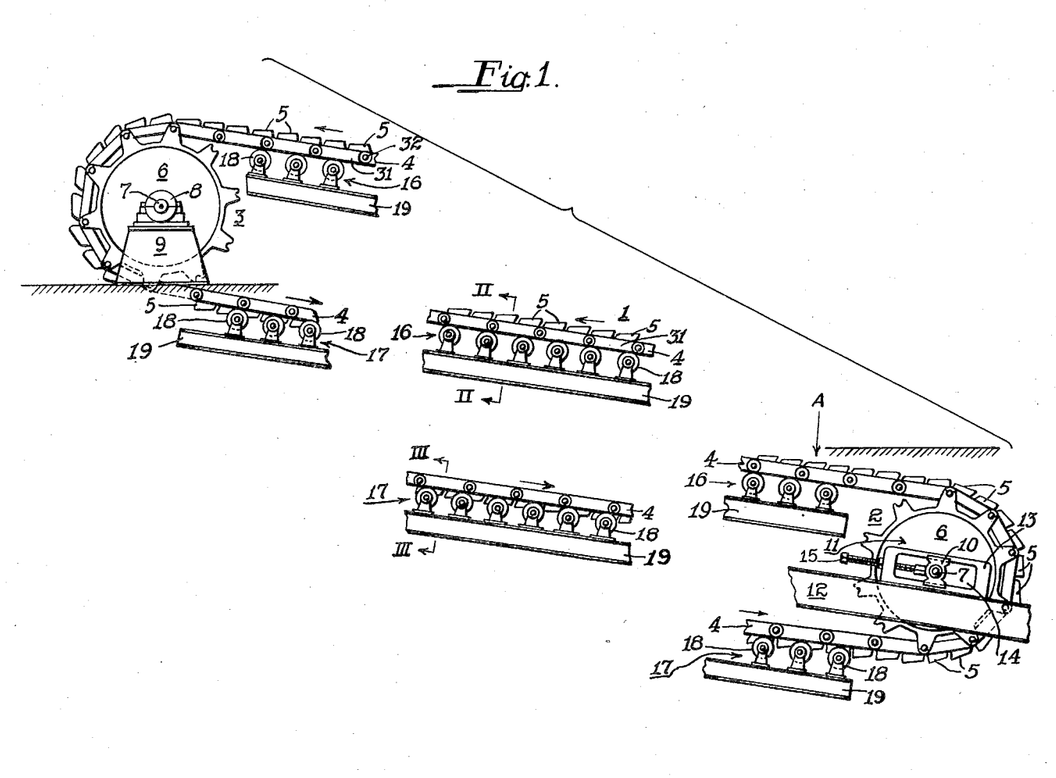
Figure 1 is a fragmentary fore-shortened general organization view in side elevation of a machine embodying one form of the invention, the head and tail sprockets being shown in the relative elevational positions which they would occupy if a full side view of the machine were shown.

The pig casting machine illustrated in the drawings represents what now appears to be a preferred embodiment of the invention, and comprises an endless conveyor 1, the runs or reaches of which travel in the direction indicated by the arrows, a tail sprocket 2, and a head sprocket 3, located at a higher elevation than the tail sprocket (see Fig. 1). The conveyor can be of any desired length, depending on the number of pig moulds required and the speed at which the conveyor is to be operated. In the type of machine illustrated, molten metal is poured from a supply, not shown, while the conveyor is in motion, into the moulds at a point near the tail sprocket, say at point A. The conveyor is driven at such a speed that by the time a mould has traveled from point A to the head sprocket 3, the metal, which was poured into it at point A, will be frozen or solidified. As the moulds pass over the head sprocket the pigs, so called, fall out into a receiver (not shown). In a pig machine of this type, the conveyor is driven by the head sprocket which in turn is usually driven by an electric-motor drive (not shown) coupled to the shaft thereof. By driving the conveyor in the direction indicated from the head sprocket, the upper reach of the conveyor is in tension.

Conveyor 1 includes spaced chains 4—4' of similar construction that mesh with the sprocket wheels of the tail and head sprockets 2 and 3, and these chains carry molten metal receiving molds 5. The tail sprocket 2 includes two sprocket wheels 6, spaced on and keyed to a shaft 7 as in Fig. 3a, and one of these wheels meshes with chain 4 and the other with chain 4'. Since the head and tail sprockets are identical the sprocket wheels thereof are designated by the same reference characters.

The shaft 7 of sprockets 6 is journaled in suitable bearings 8 (one on each side of the conveyor, but only one of which is shown) mounted on rugged pedestals 9. Shaft 7 of sprocket 2 is journaled in bearing 10 (one on each side of the conveyor, but only one of which is shown) mounted in take-up devices 11 carried by a structural support member 12. Only one take-up device is shown, but it will be understood that the other is on the side opposite to the one shown in Fig. 1. Each take-up device comprises a housing 13 having an elongated window 14 therein, along which a bearing 10 may be adjusted by means of a take-up screw 15. The purpose and function of these take-up devices are well understood in this art and need no further description.

Figure 2:
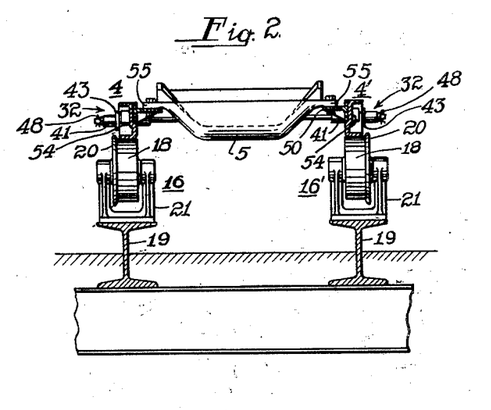
Figs. 2 and 3 are enlarged views in section of the top and bottom runs, respectively, of the conveyor taken on lines II—II and III—III of Figure 1.
Figure 3:
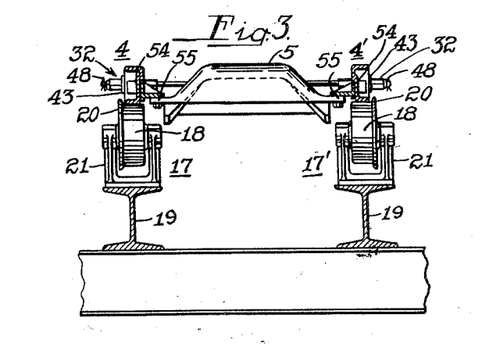

The portions of the upper and lower runs or reaches of the conveyor 1 between the head and tail sprockets are supported on tracks 16—16' and 17—17', respectively, there being two tracks for each chain, one for the upper and one for the lower reach thereof (see Figs. 2 and 3).

Each of the tracks comprises a plurality of wheels 18 supported line-in-line on I-beams 19, forming a part of the structural work required to support the conveyor. The wheels are provided with flanges 20 disposed to engage the outer edges of the chains 4—4', thereby guiding the chains and holding them on their course of travel. To support the wheels on the framework, pedestals 21 are provided. Each pedestal is preferably of U-shape to accommodate a wheel between the legs thereof, and each wheel is rotatively supported by a pin 22, the ends of which extend through the legs of the pedestal. Each wheel pin or axle 22 is preferably stationary and locked in place by means of a bolt 23 passing through one of the legs of pedestal 21 and registering with a recess 24 in the pin.

Figures 6, 22:
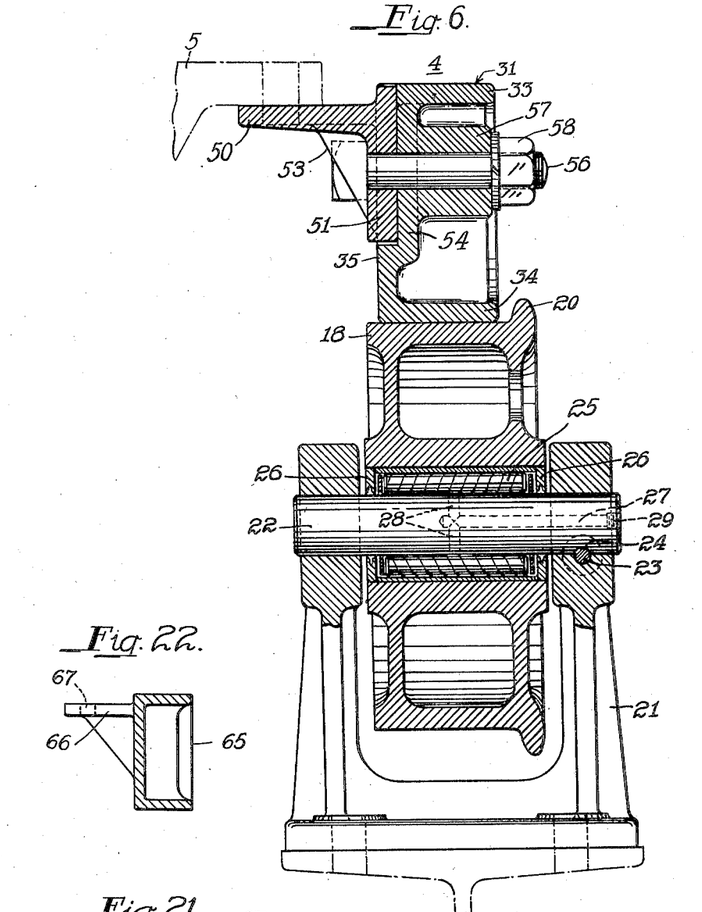
Fig. 6 is an enlarged fragmentary view in section taken on line VI—VI of Figure 5, showing the relation of the pig mould supports to the chain links and the bearing construction for the track wheels which makes lubrication practicable and usefully possible.
Fig. 22 is a cross-sectional view thereof.
Figure 7:
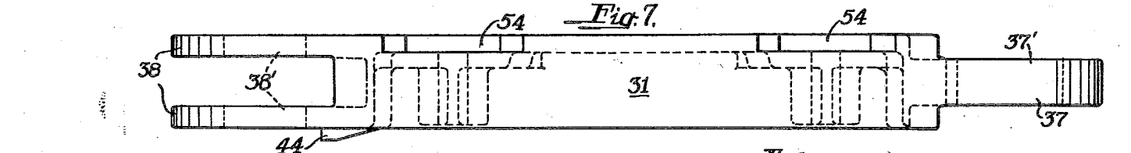
Figs. 7, 8 and 9 are enlarged top plan, rear and front elevation views, respectively, of a chain link.
Figure 8:
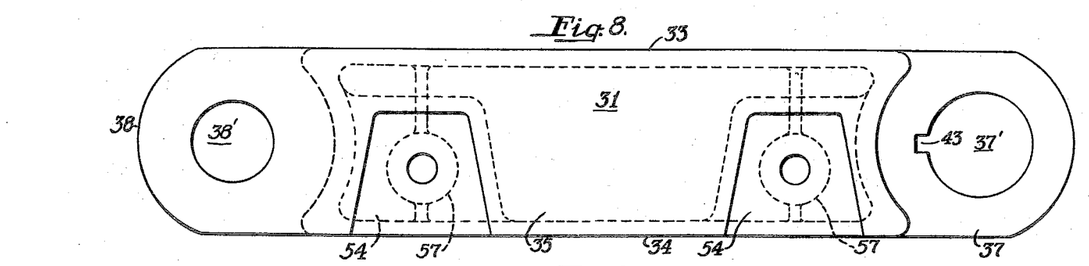
Figure 9:
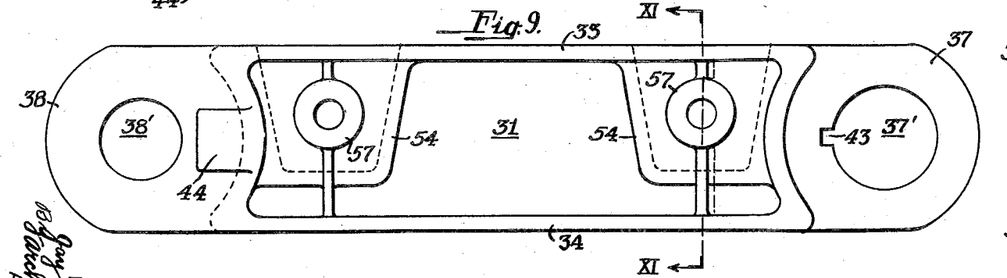
Figure 10:
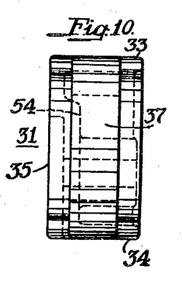
Fig. 10 is a view of the male end of a chain link.
Figure 11:
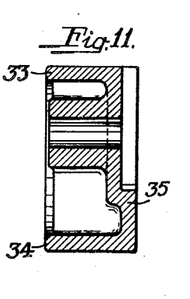
Fig. 11 is a sectional view of the link taken on line XI—XI of Figure 9.
Figure 12:
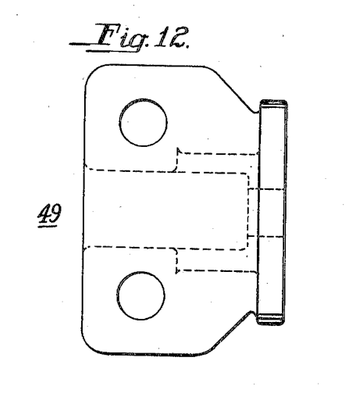
Figs. 12, 13 and 14 are top plan, side and end elevation views, respectively, of a pig mould support.
Figure 13:
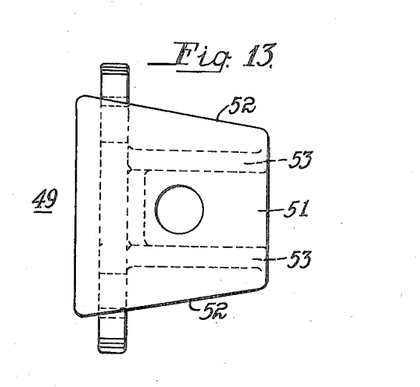
Figure 14:
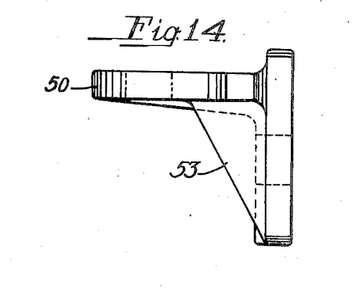
Figure 15:
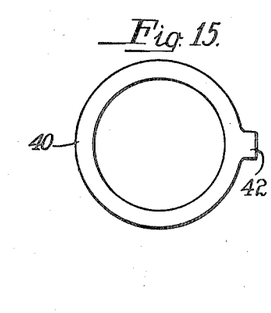
Figs. 15 and 16 are side and edge views, respectively, of a bushing which forms part of the link pin construction.
Figure 16:
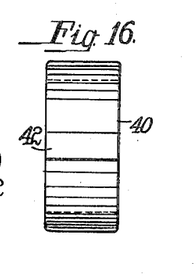
Figure 17:
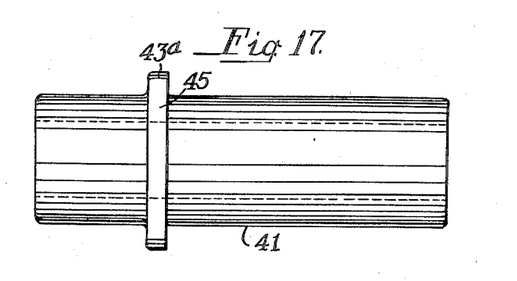
Figs. 17 and 18 are end and side elevation views, respectively, of a bushing which in combination with the bushing of Figures 15 and 16 forms a chain link pin.
Figure 18:
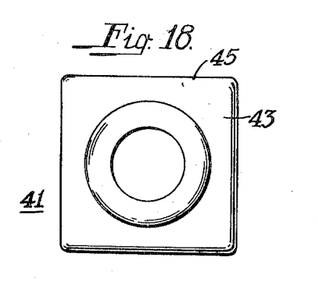
Figure 19:
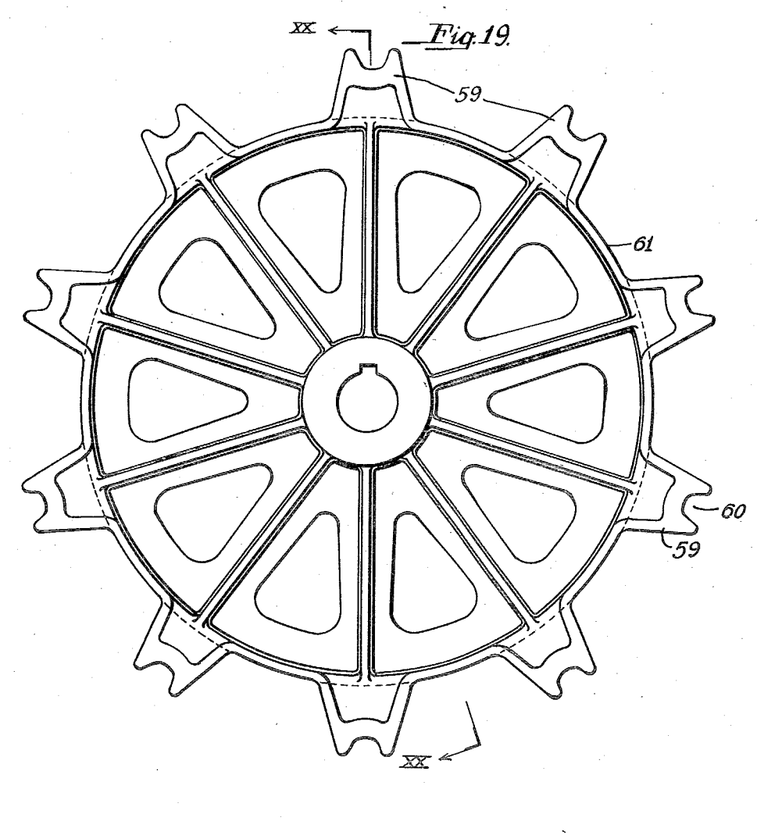
Fig. 19 is an enlarged view in side elevation of a sprocket wheel used in the head and tail sprockets.
Figure 20:
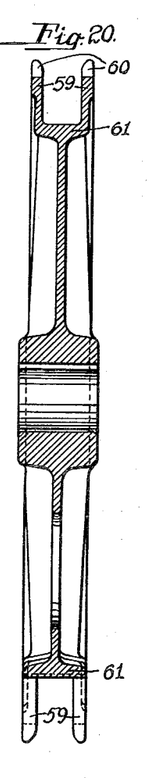
Fig. 20 is a view in section taken on line XX—XX of Figure 19.

At this point, it is to be recalled that one of the objects of this invention was to provide a pig machine which could be lubricated with effectiveness and that the construction of the links of the conveyor chains was to be such that no wear would take place at the ends of the links where they are joined by the link pins. By employing stationary wheels to provide a track for the conveyor chains, the wheels are not subject to extremely high temperatures. One reason for this is that no appreciable amount of heat is transferred from the pig moulds to the wheels by conduction because only line contact occurs between the links of the chains and the wheel. The heat transferred by convection and radiation, while considerable, is not sufficient to raise the temperature of the wheels to a point where lubrication cannot be effectively maintained. While the stationary wheel track is ideal for lubrication, this type of construction lends itself also to the use of anti-friction bearings which in itself vastly improves the ease and smoothness of operation of the conveyor and materially reduces the power required to drive the conveyor. Each wheel, as shown by Fig. 6 is designed to be lubricated and is also provided with an anti-friction bearing 25. The hub of each wheel is provided with oil seals 26, of any suitable construction, which retain the lubrication supplied to the bearings.

Figure 4:
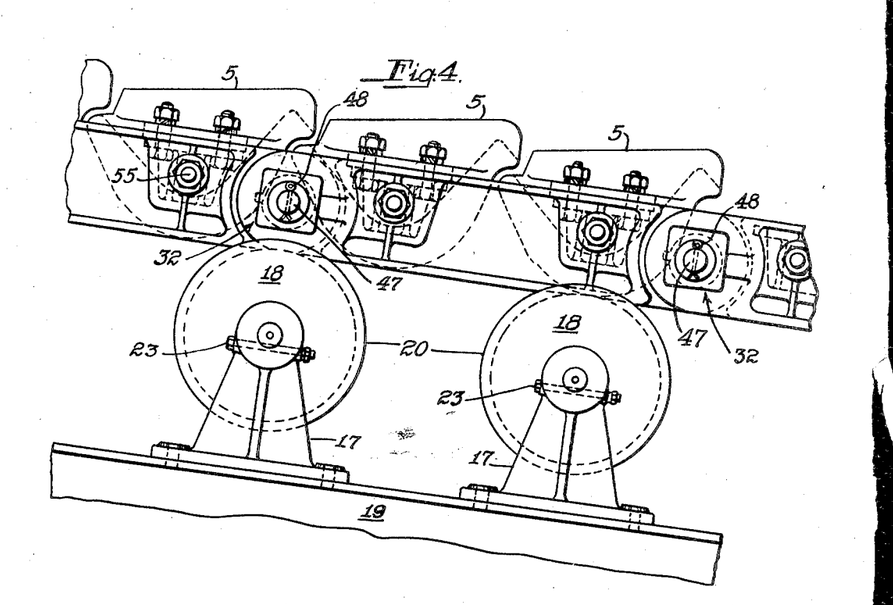
Figs. 4 and 5 are enlarged fragmentary side elevational and top plan views showing the construction of the track wheels and chains on one side of the machine and the arrangement for supporting the pig moulds on and securing them to the links of the chains.

To facilitate lubrication, each wheel pin is provided with a passageway 27 extending from the outer end thereof and this passage terminates in a transverse passageway 28 that communicates at each end with the bearing. Passageway 27 may be threaded as at 29 to receive a lubricating fitting or the wheel pins may be connected up to a lubricant distribution line through which lubricant may be conveyed at constant pressure or intermittently. Since such methods or systems for supplying lubricant are well known in the art, it is believed unnecessary to illustrate and describe them herein. The chains of conveyor 1 are made up of links 31 which for convenience of manufacture are made identical in shape and form and interchangeable i. e., the links can be used in either of chains 4 or 4'. These links as shown in Figs. 1 and 4 are connected by link pins 32.

To avoid sagging of the chains at the point between track wheels 18, the length of the links, as measured from center to center of the link pins, is made greater than the distance between wheels 18 as measured from center to center of the wheel pins 23. By utilizing links of such length, each link will have at all times a two point support. This is so even when the joined ends of two links are between a pair of wheels 18, because each link is solidly supported by a wheel and because any portion of a link that overhangs a wheel on one side tends to be counterbalanced by the portion of the link overhanging the other side of the wheel.

As may be seen in Figs. 3a, 6 and 7 to 11 inclusive, the body of such link is of substantially channel shape in section i. e., there are two horizontal flanges 33 and 34 connected at their inner edges by a vertical web 35. One end of each link has a tongue 37 positioned centrally of the link body and two spaced tongues 38 which in effect are continuations of the sides of the body. The space between tongue 38 is such that a tongue 37 of an adjacent link may be received between them. Tongues 37 and 38 are provided with pin holes 37' and 38' to receive the link pins 32. Pin holes 37' are larger in diameter than holes 38' for a purpose that will be apparent from the description of the link pins. If one is concerned only with the coupling of the links together without regard to the question of moving parts, any kind of link pin could be used.

But if one is concerned with reducing the number of moving parts, and the attendant wear, a link pin of the type illustrated in Figs. 15 to 18 inclusive is preferred. The links and the pins are designed to prevent relative turning of the pins and the links thereby avoiding any wear on the surfaces of the links engaged by the pins.

The link pins each comprise a relatively short ring-like bushing 40 and a relatively long bushing 41. Bushing 40 is received in the pin hole of a tongue 37 and the length thereof is substantially equal to the width of the tongue. To prevent turning of this bushing in the pin hole, the bushing is formed with a key or lug 42 that registers with a keyway 43.

Bushing 41 is relatively long and portions thereof may extend beyond the tongues 38 to be engaged by the teeth of sprockets whereby the center of pull of the head sprocket will be coincident with the longitudinal axes of the links, as will be explained later herein.

The outside diameter of bushing 41 is made slightly less than the diameter of pin holes 38' and the internal diameter of bushing 40. The difference between the internal diameter of bushing 40 and the external diameter of bushing 41 should be such as to provide a neat running fit.

Bushing 41 passes through pin holes 38' and bushing 40 and is provided with a flange 43a that engages a tongue 38 on the outside of a link. To prevent turning of bushing 41 in pin holes 38' the outside tongue 38 is provided with a lug 44 that engages a flat side 45 of the bushing flange 43a. For convenience, flange 43a is made square in form thereby providing four flat sides 45 any one of which may have locking engagement with lug 44. When a pair of links have been connected by a link pin 32 the only surfaces that are subjected to wear are the internal surface of bushing 40 and that portion of the external surface of bushing 41 engaged by bushing 40.

In order to hold link pins 32 in place, means 47 are provided. Means 47 is preferably a rod which extends through bushings 41 of a pair of links, i. e., a link in each chain 4 and 4', the bushings being hollow to accommodate the rods. Rods 47 serve a three-fold function, one being to hold the link pins in place, another being to resist spreading of the conveyor chains, and a third being to reenforce the link pins. The rods may be held in place with cotter pins 48.

It will be apparent from the construction of the links 31 and track wheels 18, that the mechanical wear on these parts in service will be practically negligible, and that only the bushings are likely to encounter appreciable wear, but as these bushings are small, inexpensive, and easily renewed, the maintenance cost of a machine of this character should be exceptionally low.

Figure 5:
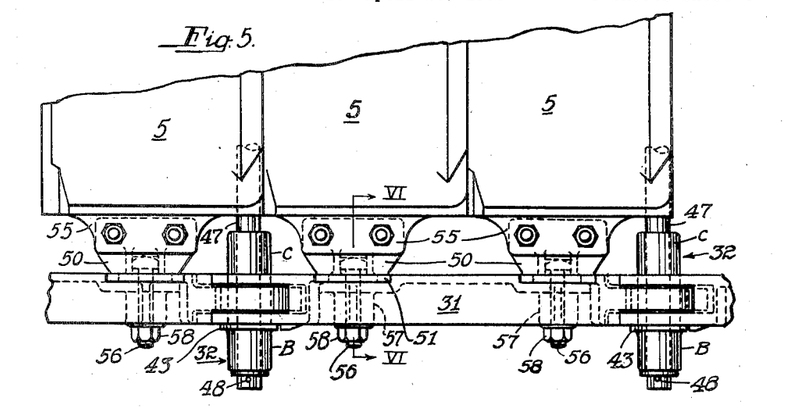

The moulds 5 are secured to the links 31 of the chains by means of supports 49. For moulds of standard size, links 31 are long enough to carry two moulds as shown in Figs. 4 and 5. Supports 49 each include a horizontal flange 50 and a vertical flange 51 having downwardly converging sides 52, and these flanges are reenforced with webs 53. The inner face of web 35 of each link is recessed adjacent the ends of the body thereof as at 54, by offsetting the web. These recesses are open at the top and are given a shape corresponding to the shape of flanges 51 of supports 49.

Each pig mould has a flange 55 at each end which is bolted to the flange 50 of a support 49, two bolts being preferred and the vertical flange 51 of each support is secured to its associated link with a single bolt 56.

Preferably one-eighth inch clearance is provided around each of the bolts which connect the flanges 55 to the flanges 50, so that there can be such pivotal movement between the moulds and the chains that if, through wear at the joints, one chain 31 lags behind the other chain 31, the apparatus can be continued in use without such overstrain as will cause breakage of the parts.

To give rigidity to the attachment of supports 49 to links 31, a cored boss 57 is formed at each point where a bolt 56 is employed, and these bosses extend to the outer faces of the links and form an abutment for the nuts 58 which are threaded on the bolts. By securing the pig moulds to the chain links in this manner, moulds may be replaced conveniently by merely taking out bolts 56 and lifting the mould with its supports out of the links. It will of course be understood that the bolts that connect the molds to the flanges can have a snug fit with the holes, if no flexible or pivotal connection is desired, as where the conveyor is short and the cumulative wear will not be great.

Figure 21:
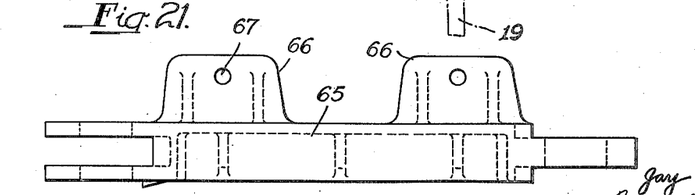
Fig. 21 is a plan view showing a modification of the chain link structure of Figs. 6 to 9.

Figs. 21 and 22 show a modified form of chain link 65 which may be employed in lieu of the links heretofore described. The horizontal flanges 66, which correspond to the flanges 50 of the previously described links, are cast integrally with the links instead of being bolted thereto. These flanges are each provided with a single hole 67 for receiving bolts that connect the molds 5 to the chains. A pair of molds 5 can be connected to each chain link, and the single bolt connection at each end of a mold will permit of some lost motion or pivotal movement which will reduce strains which would occur if one chain lags somewhat behind the other, through wear in the chain links or at the sprockets. It will be understood, of course, that two holes could be provided in each of these flanges as in the case of the flanges 50.

The sprocket wheels 6 are provided with a series of double teeth 59, spaced to straddle links 31 and to engage the link pins 32 on opposite sides of the links at points B and C. Teeth 59 are provided with somewhat half round recesses 60, in which the bushings 41 of the link pins are received as the chains pass over the sprockets. As may be seen in Fig. 3a, the teeth are made so long that ample clearance is provided between the bottom of links 31 and the rim 61 of the sprocket wheels.

Figure 3A:
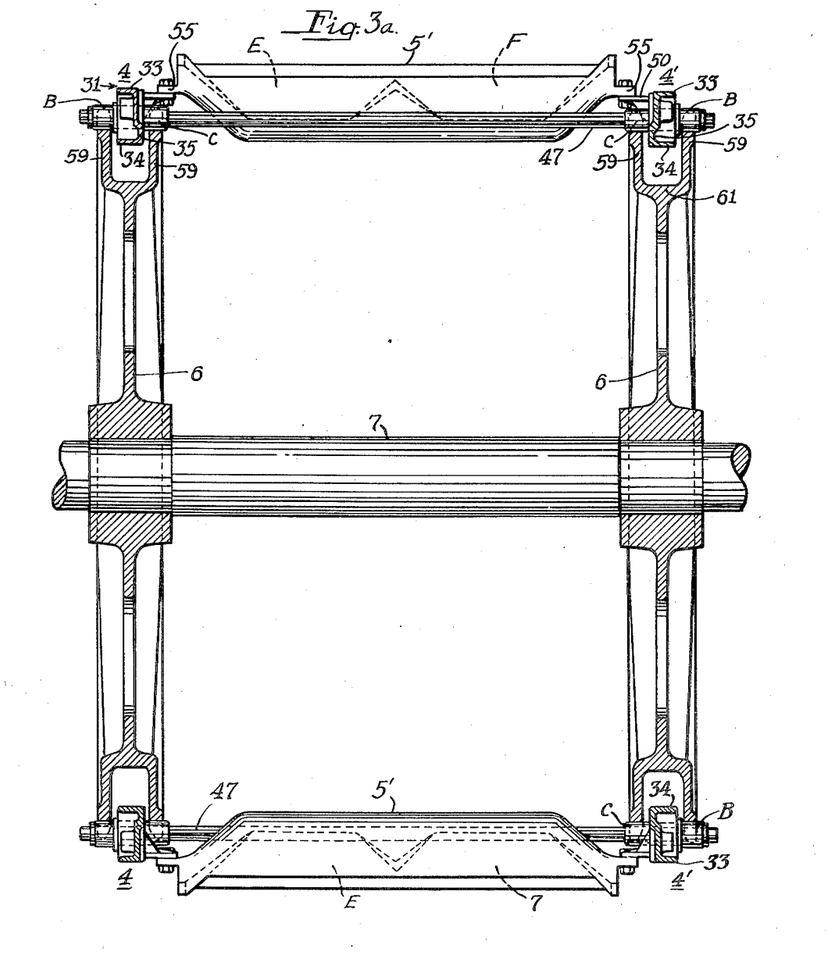
Fig. 3a is a view in section of a sprocket and chain assembly such as illustrated by the views previously described but showing a modified form of mould.

The type of machine disclosed herein lends itself to greater capacity than prior art machines because of the ruggedness of the links, the ease of operation afforded by the anti-friction bearing track wheels and the straight pull which the head sprocket imposes on the links. This increased capacity can be obtained by employing usually long conveyors or, for a given length of conveyor, by employing double moulds 5', such as shown in Fig. 3a. These double moulds have two cavities E and F, each of which can be large enough to allow pigs of standard size to be cast. When double moulds are used, the spacing between the sprocket wheels 6 and the chains 4—4' would be increased to the extent required, and this can be accomplished without appreciably increasing the dimensions of the chain links, the link pins or the sprocket wheels.

Heretofore the chains, link pins, and wheels of prior art machines have been made of special alloy steel, i. e., high manganese steel that will resist wear and corrosion resulting from high temperatures. This alloy was difficult to cast and practically impossible to machine, in fact it has been the practice to resort to so-called precision casting, allowing sufficient clearances for moving parts to make machining unnecessary. The pig machine herein disclosed affords opportunity for such ruggedness of design that it is possible to use good steel castings for links, and machined hardened high grade steel bushing link pins. Of course these link pins can also be made of high grade manganese steel cast to exact dimensions. But since the link pins represent such a small part of the total metal employed, only a small part of the machine is required to be made of expensive material, whereas the prior art machines, the entire links, the link pins and wheels were made of expensive wear-resistant metal. The wheels may be of cast iron or cast steel and these also may be machined to provide fine working fits.

I claim as my invention:

1. A metal casting machine comprising spaced endless chains made up of links, molten metal receiving moulds carried by opposite links of said chains, sprocket wheels at the head and tail of each of said chains and a track for supporting the forward and return reaches of the chains, said tracks comprising stationarily mounted wheels disposed line-in-line, each link comprising a body having spaced horizontal flanges connected by a vertical web, said body having at one end a centrally disposed tongue and at the other end provided with spaced tongues between which the centrally disposed tongue of an adjacent link may be received, said tongues being apertured to receive a link pin arranged to mesh with the teeth of the sprocket wheels.

2. A metal casting machine comprising spaced endless chains made up of links, molten metal receiving moulds carried by opposite links of said chains, sprocket wheels at the head and tail of each of said chains and a track for supporting the forward and return reaches of the chains, said tracks comprising stationarily mounted wheels disposed line-in-line, each link comprising a body having spaced horizontal flanges connected by a vertical web, said body having at one end a centrally disposed tongue and at the other end provided with spaced tongues between which the centrally disposed tongue of an adjacent link may be received, said tongues being apertured to receive a link pin arranged to mesh with the teeth of the sprocket wheels, characterized by the fact that the inner face or side of vertical webs of said links are recessed to receive angle members and that the opposite ends of a mould are secured to the angle members of directly opposed links of said chains.

3. A metal casting machine comprising spaced endless chains each made up of links, sprocket wheels at the head and tail ends of each chain, and molten metal receiving moulds carried by the links of said chains, characterized by the fact that the links of each chain are connected together by link pins having portions projecting on each side thereof, and that each sprocket wheel is provided with double teeth spaced to straddle the links of the chain running thereon.

4. A metal casting machine comprising spaced endless chains each made up of pin-connected links, sprocket wheels disposed at the head and tail ends of said chains, track means for supporting the forward and return reaches of said chains, members abutting against the inner faces of the links of said chains, means for removably securing said members to said links, an inwardly projecting portion on each of said members for covering each of said securing means, and molten metal receiving moulds carried by the projecting portions of said members.

5. A metal casting machine comprising spaced endless chains each made up of a series of pin-connected links, sprocket wheels disposed at the head and tail ends of said chains, roller elements for supporting the forward and return reaches of said chains, a member abutting against the inner face of each link of each said chain and having a shelf extending inwardly at substantially right angles to said link, means projecting underneath and protected by said shelf for securing each said member to its respective link, a molten metal receiving mould having a flange on each end thereof adapted to rest on the shelves of the members on directly opposite links, and means for securing said flanges to said shelves.

6. A metal casting machine comprising spaced endless chains each made up of a series of pin-connected links and each having a recess in its inner face, sprocket wheels disposed at the head and tail ends of said chains, anti-friction means for supporting the forward and return reaches of said chains, a member mounted in the recess of each said link and having a shelf extending inwardly at substantially right angles to said link, means projecting underneath and protected by the shelf on said member for securing each said member to its respective link, and a molten metal receiving mould having its ends secured to the shelves of opposed members.

7. A metal casting machine comprising spaced endless chains made up of links carrying molten metal receiving moulds, sprocket wheels driving the chains, and spaced stationarily mounted wheels for supporting the forward and return reaches of the chains, characterized by the fact that each mould is secured to directly opposite links of said chains, and also characterized by the fact that links of each chain are connected by link pins having portions projecting to each side of such links, and that the sprocket wheels associated with each chain are provided with double teeth spaced to straddle the links of such chain and to engage the projecting portions of the link pins to thereby exert a pull on the chains, the direction of which is substantially coincident with the longitudinal axes of the links.

8. A metal casting machine comprising spaced endless chains made up of links carrying molten metal receiving moulds, sprocket wheels driving the chains, and spaced stationarily mounted wheels for supporting the forward and return reaches of the chains, characterized by the fact that each mould is secured to directly opposite links of said chains, and also characterized by the fact that the links each comprise a body having spaced horizontal flanges connected by a vertical web, said body having at one end a centrally disposed tongue and at the other end provided with spaced tongues between which the centrally disposed tongue of an adjacent link may be received, said tongues being apertured to receive a link pin arranged to mesh with the teeth of the sprocket wheels.

9. A metal casting machine comprising pairs of head and tail sprockets, spaced endless chains made up of pin connected links operating over said sprockets and carrying molten metal receiving moulds extending crosswise between the chains and a series of spaced stationarily mounted wheels supporting the forward and return reaches of the chains, characterized by the fact that the links of each chain are connected by link pins taht project from each side of the links and that each sprocket wheel is provided with circumferentially arranged pairs of teeth spaced to straddle the links of a chain running thereon and to engage the projecting portions of the link pins of such chain.

10. In a pig casting machine, a pair of spaced head sprockets, a pair of spaced tail sprockets, an endless conveyor operating over said sprockets and made up of two parallel endless chains of pin connected links, each chain running over one head sprocket and one tail sprocket, each of said links being equipped with a support portion which projects inwardly toward the longitudinal center of the conveyor, molten metal receiving molds carried by said support portions, lost motion connections between said molds and said supports to prevent breakage in event of one of said chains running ahead of the other, and two parallel rows of spaced, aligned, fixed axis wheels which bridge the distance between said head and tail sprockets and support the links making up the forward and return reaches of said conveyor.

JAY W. FERREE.

CERTIFICATE OF CORRECTION.

Patent No. 2,167,883. August 1, 1939.

JAY W. FERREE.

It is hereby certified that error appears in the printed specification of the above numbered patent requiring correction as follows: Page 4, first column, line 16, for the word "usually" read unusually; and that the said Letters Patent should be read with this correction therein that the same may conform to the record of the case in the Patent Office.

Signed and sealed this 26th day of September, A. D. 1939

(Seal)

Henry Van Arsdale,
Acting Commissioner of Patents.